(12) United States Patent
Nakamura

(10) Patent No.: US 7,251,543 B2
(45) Date of Patent: Jul. 31, 2007

(54) INTERFERENCE CHECKING DEVICE

(75) Inventor: Takayuki Nakamura, Yamatokoriyama (JP)

(73) Assignee: Mori Seiki, Co., Ltd., Yamatokoriyama-shi (JP)

( * ) Notice: Subject to any disclaimer, the term of this patent is extended or adjusted under 35 U.S.C. 154(b) by 218 days.

(21) Appl. No.: 11/160,259

(22) Filed: Jun. 16, 2005

(65) Prior Publication Data

US 2005/0283270 A1  Dec. 22, 2005

(30) Foreign Application Priority Data

Jun. 17, 2004 (JP) ............................. 2004-179129

(51) Int. Cl.
*G06F 19/00* (2006.01)

(52) U.S. Cl. ............... 700/178; 700/159; 700/174; 703/2; 717/104

(58) Field of Classification Search ............... 700/159, 700/174, 177, 178; 703/2; 717/104
See application file for complete search history.

(56) References Cited

U.S. PATENT DOCUMENTS 3,691,655 A * 9/1972 Kurimoto et al. .............. 483/7
5,106,258 A * 4/1992 Orii ........................... 414/733
5,144,740 A * 9/1992 Yasuda ......................... 483/4
6,220,316 B1 * 4/2001 Lin ........................... 144/242.1

FOREIGN PATENT DOCUMENTS

| JP | S59-154507 A | 9/1984 |
| JP | S63-213003 A | 9/1988 |
| JP | H02-059256 A | 2/1990 |
| WO | WO-98-19822 A1 | 5/1998 |
| WO | WO-02/03155 A1 | 1/2002 |

* cited by examiner

*Primary Examiner*—Leo Picard
*Assistant Examiner*—Sheela Rao
(74) *Attorney, Agent, or Firm*—Judge & Murakami IP

(57) ABSTRACT

Interference checking device including: a modeling database that stores data for three-dimensional modeling of tools, workpieces, and machine-tool constituting structures; an interference data memory for storing interference data defining inter-component interference relationships among the tool, the workpiece, and the structures; and an interference checking processor that, based on structure movement commands sent from a program analyzer for the machine tool, and on data stored in the modeling database and interference data memory, determines whether the tool, the workpiece, and the structures will interfere with each other. Movement commands in a block at least one block succeeding the block being executed in order to control the drive mechanisms that move the structures are sent from the program analyzer to the interference checking processor.

6 Claims, 9 Drawing Sheets

FIG. 5

| SHAPE DATA | | | | |
|---|---|---|---|---|
| FACE | | EDGE | | COORDINATE OF VERTEX |
| FACE NUMBER | EDGE NUMBER | EDGE NUMBER | VERTEX NUMBER | |

| FACE NUMBER | EDGE NUMBER |
|---|---|
| F1 | E1, E2, E3, E4 |
| F2 | E5, E6, E7, E8 |
| F3 | E1, E9, E5, E10 |
| ...... | ...... |

| EDGE NUMBER | VERTEX NUMBER |
|---|---|
| E1 | V1, V2 |
| E2 | V2, V3 |
| E3 | V3, V4 |
| ...... | ...... |

| VERTEX NUMBER | COORDINATE | | |
|---|---|---|---|
| | X | Y | Z |
| V1 | X1 | Y1 | Z1 |
| V2 | X2 | Y2 | Z2 |
| V3 | X3 | Y3 | Z3 |
| ...... | ...... | ...... | ...... |

| EQUATION DATA FOR FACE | |
|---|---|
| FACE NUMBER | COEFFICIENT FOR EQUATION |
| F1 | A1, B1, C1, D1 |
| F2 | A2, B2, C2, D2 |
| F3 | A3, B3, C3, D3 |
| ...... | ...... |

| EQUATION DATA FOR EDGE | |
|---|---|
| EDGE NUMBER | COEFFICIENT FOR EQUATION |
| E1 | a1, b1, c1, d1 |
| E2 | a2, b2, c2, d2 |
| E3 | a3, b3, c3, d3 |
| ...... | ...... |

| AXIS DATA |
|---|
| * * * * |

| SPINDLE | GROUP 1 | INTERFERENCE RELATIONSHIP |
| --- | --- | --- |
| CHUCK | GROUP 1 | INTERFERENCE RELATIONSHIP |
| WORKPIECE | GROUP 1 | CUTTING RELATIONSHIP |
| FIRST SADDLE | GROUP 2 | INTERFERENCE RELATIONSHIP |
| SECOND SADDLE | GROUP 2 | INTERFERENCE RELATIONSHIP |
| TOOL REST | GROUP 2 | INTERFERENCE RELATIONSHIP |
| TOOL — TOOL BODY | GROUP 2 | INTERFERENCE RELATIONSHIP |
| TOOL — TIP | GROUP 2 | CUTTING RELATIONSHIP |

# INTERFERENCE CHECKING DEVICE

BACKGROUND OF THE INVENTION

1. Technical Field

The present invention—in machine tools furnished with a plurality of structures including at least tool-and workpiece-holding structures, and furnished with drive mechanisms for driving structures, among the plurality of structures, that are equipped to be movable, and with a controller for controlling the drive mechanisms based on a machining program—relates to interference-checking devices that check whether movement by the movable structures will cause the moving structures themselves, the other structures apart from the moving structures, or the tools or the workpieces to interfere with each other.

2. Description of the Related Art

A lathe, which is one type of machine tool, comprises a plurality of structures, namely a bed, headstock, spindle, saddle, tool rest and tailstock, along with feed mechanisms that let the saddle, tool rest and tailstock travel, with the tool held in the tool rest and the workpiece held by the spindle. In addition, a machining center comprises a plurality of structures, namely a bed, column, spindle head, spindle, saddle and table, along with feed mechanisms that let the column, spindle head, saddle and table travel, with the tool held in the spindle and the workpiece held on the table. Moreover, the feed mechanisms are controlled by a controller so that their operation is appropriately controlled according to a machining program.

This machining program is written according to the design for the shape of the workpiece, and after being written, the program is checked for errors before the actual machining. If errors are present, that portion is revised, and if no errors are present, the machining program is used to perform continuous machining. This advance check of the machining program is done in this manner because, if such errors are present, there is a risk of serious accidents involving the tool, workpiece or other structures interfering with each other.

Moreover, this check (interference check) is conventionally performed by operating the machine tool, and running the machining program being checked in a trial operation mode that does not involve machining of the workpiece, and having the operator check the direction of feed of the tool as appropriately displayed on an image display device (see JP H2-59256A).

Specifically, the controller for the machine tool performs a sequential analysis of each block of the machining program, recognizes the travel position and feedrate of the tool, and calculates the direction of travel, amount of travel and method of travel (cutting feed or rapid feed) of the tool based on the travel position and feedrate thus recognized. Thereafter, based on the direction of travel and amount of travel thus calculated, these are displayed as vectors on the image display device, and the method of travel is indicated by means of the display color (white in the case of cutting feed and red in the case of rapid feed). Note that in the analysis of the machining program, a block ahead of (succeeding) the block being executed in order to control the travel of the tool is analyzed, and thus the future direction of travel and method of travel of the tool are displayed sequentially on the image display device.

Then, the operator checks the display screen thus displayed, determines the direction of travel, amount of travel and method of travel of the tool, and checks to see if any of this will interfere with the workpiece (thus checking for errors in the machining program).

However, in the conventional example described above, the direction of travel, amount of travel and method of travel of the tool are displayed with vectors and there is a problem in that this display alone is not sufficient for the operator to accurately predict the positional relationships between the tool and workpiece after travel, and as a result, the operator cannot accurately determine whether interference is present or not.

Moreover, interference may occur in a machine tool not only between the tool and workpiece, but rather, for example, the tool rest may interfere with another structure during its travel, or when the spindle is indexed so that the workpiece rotating about its central axis comes to a predetermined angular position of rotation, the workpiece may interfere with the tool or another structure, so there is a possibility of other types of interference arising between the tool or workpiece and a structure or between structures, and these interfering relationships cannot be checked in the conventional example described above.

In this manner, in the conventional example described above, not all of the interfering relationships that could possibly occur in a machining tool can be checked accurately and efficiently.

BRIEF SUMMARY OF THE INVENTION

The present invention came about in consideration of the situation described above and has as its object to provide an interference checking device that is able to check for the presence of interference accurately and efficiently for all interference relationships that could arise in a machine tool.

In order to achieve the object described above, an interference checking device in accordance with one aspect of the present invention is an interference checking device for a machine tool including: a plurality of structures including at least a structure that holds a tool and a structure that holds a workpiece, drive mechanisms that drive those of the plurality of structures that are movable, and a controller including an analytical processor that sequentially analyzes a machining program block by block and extracts at least the movement commands pertaining to the movable structures, and a control execution processor that generates control signals based on the movement commands sequentially extracted by the analytical processor and controls the operation of the drive mechanisms based on the control signals thus generated; the interference checking device checking for mutual interference among the movable structures, other structures, the tool and the workpiece that might occur due to the movement of the movable structures that are driven by the drive mechanisms and whose operation is controlled by the controller, and the interference checking device comprising: a modeling data memory that stores three-dimensional modeling data comprising at least shape data defining the three-dimensional shapes of the tool, the workpiece and the structures, along with information related to axes of travel and/or axes of rotation defined for the tool, the workpiece and the structures, an interference data memory that stores interference data defining mutual interference relationships among the tool, the workpiece and the structures, and an interference determination processor that: sequentially receives from the analytical processor the movement commands of a block at least one block ahead of the block being executed by the control execution processor of the controller; based on the movement commands thus received and the three-dimensional modeling data stored in the modeling data memory, generates three-dimensional modeling data of the state in which the structures have been moved according to the movement commands; based on the three-dimensional modeling data thus generated and the interference data stored in the interference data memory, determines whether or not the movement of the structures will cause mutual interference between the moving structures, the other structures, the tool and the workpiece; and updates the three-dimensional modeling data stored in the modeling data memory with the three-dimensional modeling data thus generated.

With this aspect of the present invention, three-dimensional modeling data comprising at least shape data defining the three-dimensional shapes of the tool, the workpiece and the structures, along with information related to axes of travel and/or axes of rotation defined for the tool, the workpiece and the structures is generated appropriately in advance and stored in the modeling data memory.

Note that examples of the structures may include, if the machine tool is a lathe, for example: the bed, the headstock disposed on the bed, the spindle that is rotatably supported by the headstock, the chuck that is mounted to the spindle and that holds the workpiece, the saddle moveably disposed on the bed, the tool rest that is disposed on the saddle and that holds the tool, the tailstock moveably disposed on the bed, and the tailstock spindle held in the tailstock. Or, if the machine tool is a machining center, for example: the bed, the column disposed on the bed, the spindle head that is moveably supported on the column, the spindle that is rotatably supported by the spindle head and that holds the tool, and the table that is moveably disposed on the bed and that holds the workpiece are also examples of structures. Moreover, covers and guards are also typically provided in order to prevent the intrusion of chips and cutting fluid and the like, so these covers and guards are also examples of the structures.

The shape data may comprise vertex coordinate data for the coordinates of the various vertices constituting the three-dimensional shapes of the tool, the workpiece and the structures, equation data for the edges formed by connecting two vertices, edge data that associates the edges and the two points, equation data for faces formed by the enclosure of edges, and face data that associates the faces and the edges.

The aforementioned information related to axes of travel and/or axes of rotation is information that defines how the tool, workpiece or structures move (in travel or rotation) in the machine tool. For example, when the structure is a tool rest, this is information that indicates that it travels in the direction of the axis of the spindle, and in the case of a tool held in the tool rest, the tool moves together with the tool rest, so this is again information that it travels in the direction of the axis of the spindle. In addition, if the structure is the spindle, then this is information that indicates that it rotates around its central axis, or in the case of a chuck mounted on the spindle or a workpiece held in the chuck, both of these rotate together with the spindle, so this is information that indicates that they rotate around the central axis of the spindle.

The interference data memory stores interference data defining mutual interference relationships among the tool, the workpiece and the structures that are appropriately set up in advance. The structures may be disposed individually on the machine tool, but typically a plurality thereof is provided on the bed in a combined manner, and the tool and the workpiece are always held by appropriate structures. Accordingly, interference relationships do not arise among a tool, workpiece and structures that constitute the same assembly, but rather interference relationships are formed among tools, workpieces and various structures that constitute different assemblies.

For example, in the case of a lathe, the headstock, spindle, chuck and workpiece are all provided as a unit, and the saddle, tool rest and tool are provided as a unit, so while no interference relationships will arise among the headstock, spindle, chuck and workpiece or among the saddle, tool rest and tool, interference relationships may arise between the headstock, spindle, chuck and workpiece and the tool rest and tool. In addition, interference between the tool and workpiece can be interpreted as machining of the workpiece by the tool (that is, no interference), so strictly speaking, interference cannot be interpreted as machining unless it is between the blade of the tool and the workpiece so anything else is interference.

The interference data defines such interference relationships that arise mutually among the tool, the workpiece and the structures, and is stored in the interference data memory after being appropriately set in advance.

Moreover, based on movement commands (travel position, angular position in rotation, travel speed, etc.) pertaining to the movable structures received from the analytical processor of the controller, three-dimensional modeling data stored in the modeling data memory and interference data stored in the interference data memory, the interference determination processor determines whether or not the movement of the structures will cause mutual interference between the moving structures, the other structures, the tool and the workpiece.

Specifically, the interference determination processor sequentially receives from the analytical processor the movement commands of a block at least one block ahead of the block being executed by the control execution processor of the controller in order to control the operation of the drive mechanisms, and based on the movement commands thus received and the three-dimensional modeling data stored in the modeling data memory, generates three-dimensional modeling data of the state in which the structures have been moved according to the movement commands.

Next, based on the three-dimensional modeling data thus generated and the interference data stored in the interference data memory, for each block, regarding the interference relationships defined by the interference data, the processor determines whether or not the movement of the structure will cause mutual interference between the moving structures, the other structures, the tool and the workpiece (that is, whether or not there are portions of contact or overlap between these sets of three-dimensional modeling data), and also updates the three-dimensional modeling data stored in the modeling data memory with the three-dimensional modeling data thus generated.

For example, in the event that there are overlapping portions among the sets of three-dimensional modeling data for various structures, or between the set of three-dimensional modeling data for the tool or workpiece and the set of three-dimensional modeling data for a structure, then interference is determined to be present among the various structures or between the tool or workpiece and the structure. In addition, if there is overlap between the set of three-dimensional modeling data for the tool and the set of three-dimensional modeling data for the workpiece, then this overlap is determined to be interference between the tool in question and workpiece if it does not arise between the blade of the tool and the workpiece. In addition, even overlap that arises between the blade of the tool and the workpiece in this manner may also be determined to be interference between this tool and the workpiece if the feedrate is greater than a certain rate.

Moreover, if there is overlap between the set of three-dimensional modeling data for the tool and the set of three-dimensional modeling data for the workpiece, if this is not determined to be interference, or namely if it is determined to be machining of the workpiece by this tool, at the time of updating the three-dimensional modeling data, that overlapping region (the interfering (cut) region) is calculated and the three-dimensional modeling data is updated by deleting this region.

In this manner, the interference determination processor determines whether or not the tool, workpiece or structures interfere with each other.

Note that in order to execute this processing, the interference determination processor need not receive movement commands pertaining to movable structures from the analytical processor of the controller, but rather it may be constituted such it sequentially analyzes each block of the machining program, and extracts the movement commands of a block at least one block ahead of the block being executed by the control execution processor of the controller.

Moreover, the interference determination processor is preferably constituted such that an alarm is output when interference is determined to be present.

Moreover, the interference checking device may further comprise an image display device, and the interference determination processor is preferably constituted such that, based on the movement commands and three-dimensional modeling data stored in the modeling data memory, it sequentially generates three-dimensional modeling data and corresponding three-dimensional image data representing the structures subject to these movement commands moving in a graduated manner, and then the three-dimensional images thus generated from the start of movement to the end of movement are displayed sequentially on the image display device.

Note that the machining program may be, for example, written in advance and then appropriately stored in a memory of the controller, or may be appropriately provided as input to the controller, or appropriately input manually to the controller by means of an MDI function, or the like.

Thus, with the interference checking device according to the present invention, the interference determination processor uses three-dimensional modeling data for the tool, the workpiece and the structures to automatically check for the presence of interference with regard to the interference relationships among the tool, the workpiece and the structures defined by interference data, so interference checking can be performed accurately and efficiently with regard to any kid of interference relationship.

Moreover, the determination of interference is performed according to movement commands in a block ahead of (succeeding) the block being executed by the control execution processor, so the presence of interference can be checked in advance before the drive mechanisms are driven and the structures are actually moved under the control of the control execution processor, and thus it is possible to reliably prevent interference from arising.

Moreover, if the interference determination processor is constituted so as to provide alarm output in the case that interference is determined to occur, this alarm output can be used to sound audible alarms or cause warning lamps to light, and thus, upon realizing that interference will occur, the operator can promptly halt the operation of the drive mechanisms (halting the movement of the structures) or take other corrective action.

Moreover, if the interference checking device is provided with an image display device, and this image display device displays three-dimensional images of the structures that are moved according to the movement commands, and of the other structures, the workpiece and the tool, this is convenient because the operator will be able to visually check the movement of the structures through these images. In addition, the location where interference is occurring can be easily identified.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 5 is an explanatory diagram used to describe the data structure of the three-dimensional modeling data;

DETAILED DESCRIPTION OF THE INVENTION

Figure 1:
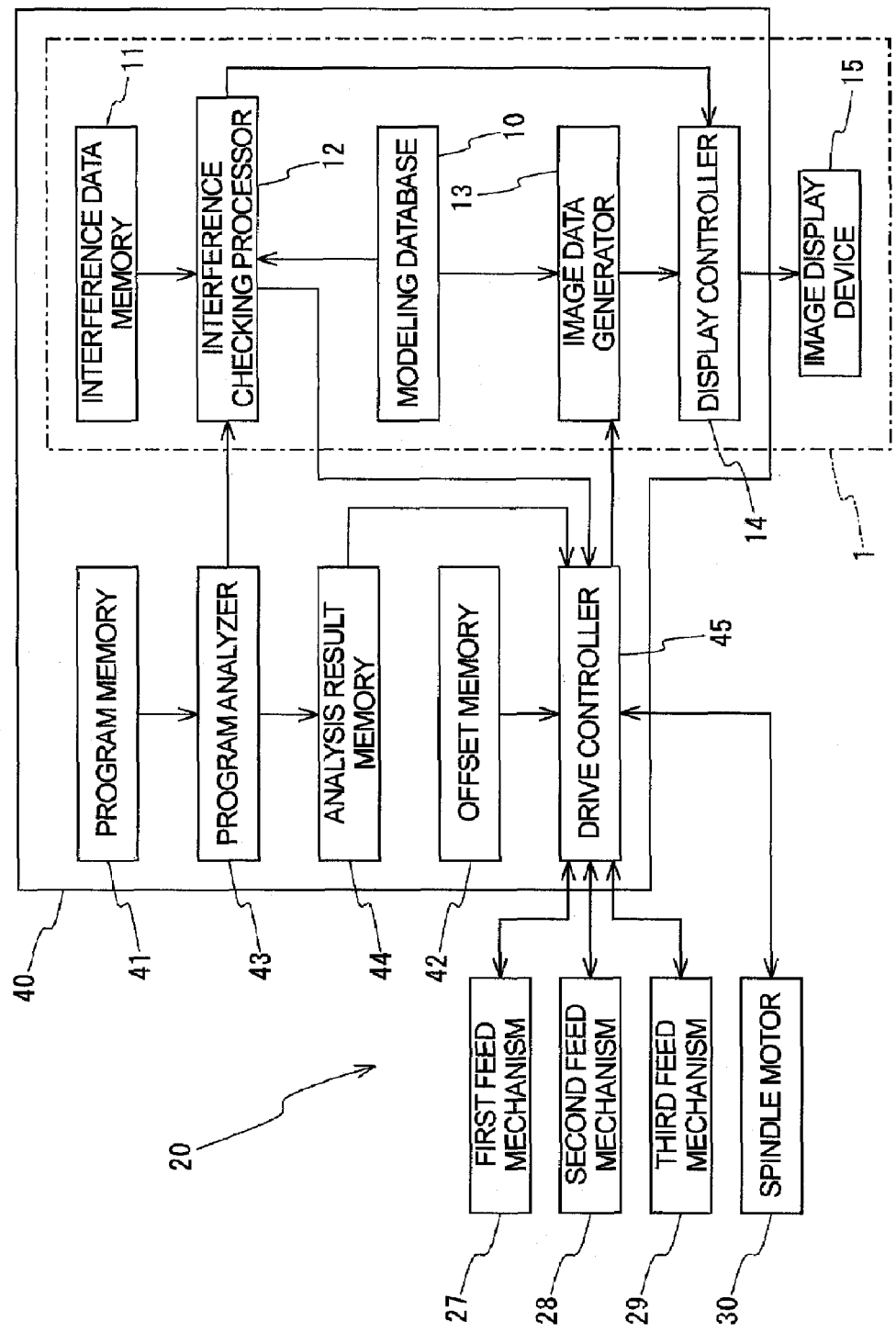
FIG. 1 is a schematic block diagram illustrating the constitution of the interference checking device according to a first embodiment of the present invention.

The following is a description of preferred embodiments of the present invention made with reference to the appended drawings. FIG. 1 is a schematic block diagram illustrating the constitution of an interference checking device according to a first embodiment of the present invention.

As shown in FIG. 1, the interference checking device 1 in this example is provided in a NC lathe 20 and comprises a modeling database 10, an interference data memory 11, an interference checking processor 12, an image data generator 13, a display controller 14 and an image display device 15.

The NC lathe 20 will be explained first.

Figure 2:
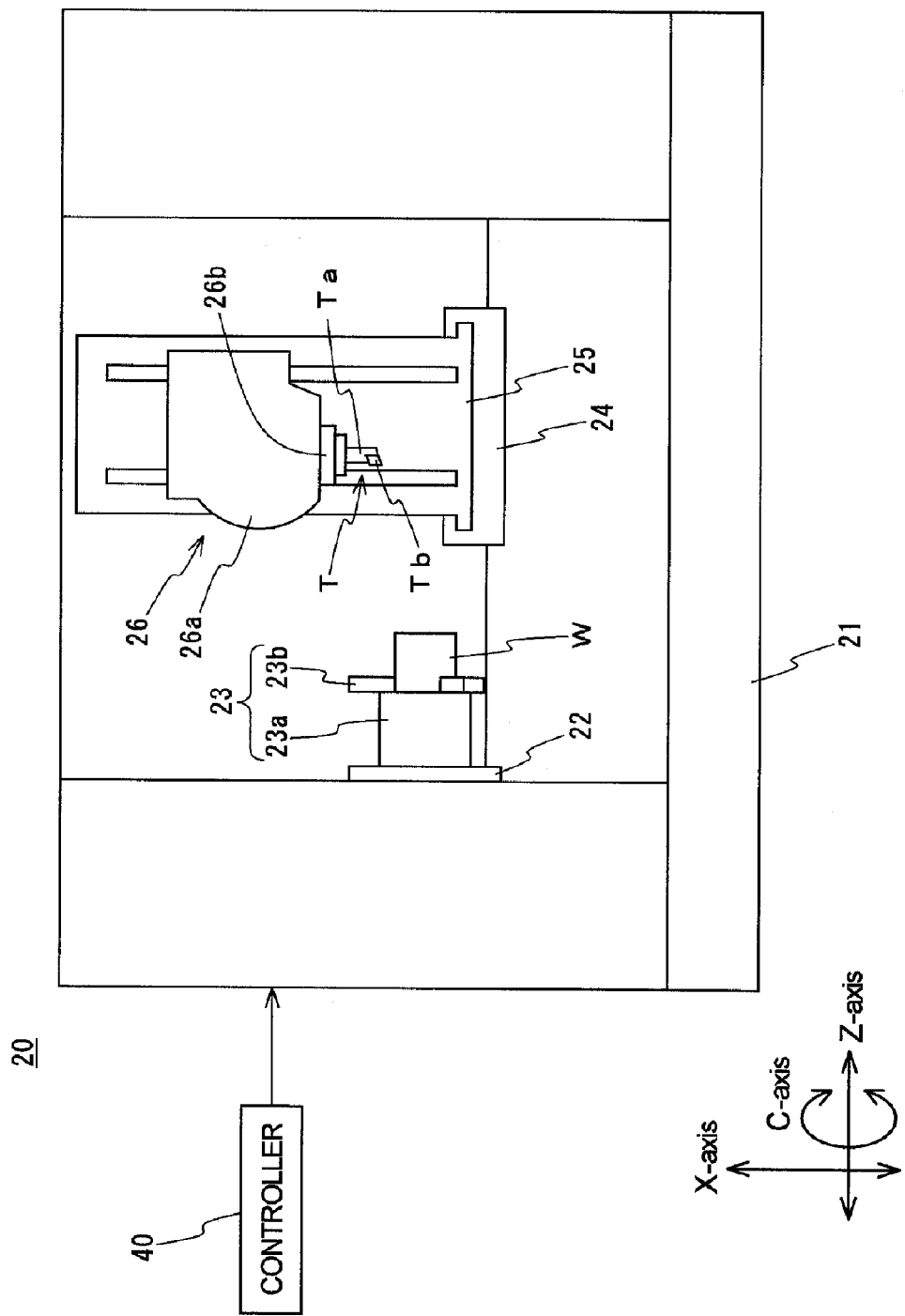
FIG. 2 is a schematic front view illustrating the constitution of a numerically-controlled (NC) lathe provided with the interference checking device according to this embodiment.

As shown in FIG. 1 and FIG. 2, the NC lathe 20 is constituted by comprising the structures of a bed 21, a headstock (not shown) disposed on the bed 21, a spindle 22 supported so as to be rotated around a horizontal central axis by the headstock (not shown) (around the Z-axis (in the direction of the C-axis)), a chuck 23 mounted to the spindle 22, a first saddle 24 provided on the bed 21 such that it is able to move in the direction of the Z-axis, a second saddle 25 provided on the first saddle 24 such that it is able to move in the direction of the Y-axis which is orthogonal to the Z-axis in a horizontal plane, a tool rest 26 disposed on the second saddle 25 such that it is able to move in the direction of the X-axis that is orthogonal to both the Y-axis and the Z-axis, along with a first feed mechanism 27 that moves the first saddle 24 in the direction of the Z-axis, a second feed mechanism 28 that moves the second saddle 25 in the direction of the Y-axis, a third feed mechanism 29 that moves the tool rest 26 in the direction of the X-axis, a spindle motor 30 that rotates the spindle 22 around its central axis, a controller 40 that controls the operation of the various feed mechanisms 27, 28, 29 and the spindle motor 30, as well as a control panel that also functions as the image display device 15 described above.

Note that the chuck 23 comprises a chuck body 23a and a plurality of jaws 23b attached to the chuck body 23a that hold the workpiece W, and the tool rest 26 is provided with a tool rest body 26a and a tool spindle 26b disposed on the tool rest body 26a that holds the tool T. In addition, the tool T comprises a tool body Ta and a tip (blade portion) Tb that is mounted to the tool body Ta and that machines the workpiece W.

The controller 40 comprises the modeling database 10, interference data memory 11, interference checking processor 12, image data generator 13 and display controller 14 described above, along with a program memory 41, offset memory 42, program analyzer (analytical processor) 43, analysis result memory 44 and drive controller (control execution processor) 45.

The program memory 41 contains an NC program that is written in advance, and the offset memory 42 contains tool offsets and workpiece origin offsets and the like. Note that a tool offset is stored for each tool T that is held in the tool rest 26 and a work origin offset is stored for each workpiece W that is held in the chuck 23.

The program analyzer 43 sequentially analyzes each block of the NC program stored in the program memory 41, extracts movement commands pertaining to the travel position and feedrate of the tool rest 26 (first saddle 24, second saddle 25) and the rotation speed of spindle motor 30 and the like, and performs the processes of storing the extracted movement commands in the analysis result memory 44 and also sending them to the interference checking processor 12.

The drive controller 45 sequentially reads the movement commands from the analysis result memory 44 and performs the processes of controlling the rotation of the spindle 22 and the travel of the tool rest 26 and the like. Specifically, with regard to the rotation of the spindle 22, control signals are generated based on current rotation speed data provided as feedback from the spindle motor 30 along with the aforementioned movement commands, and the control signals thus generated are sent to the spindle motor 30 to control it. In addition, with regard to the travel of the tool rest 26, control signals are generated based on the tool offsets for the tool T held in the tool rest 26 and the work origin offsets for the workpiece W held in the chuck 23, which are stored in the offset memory 42, along with current position data for the tool rest 26 provided as feedback from the feed mechanisms 27, 28 and 29 and the movement commands, and the control signals thus generated are sent to the feed mechanisms 27, 28 and 29 to control them.

Moreover, the drive controller 45 is constituted such that the control signals thus generated are also sent to the image data generator 13, and also, when receiving an alarm signal sent from the interference checking processor 12 as described later, the operation of the feed mechanisms 27, 28 and 29 and spindle motor 30 are halted.

Figure 3:
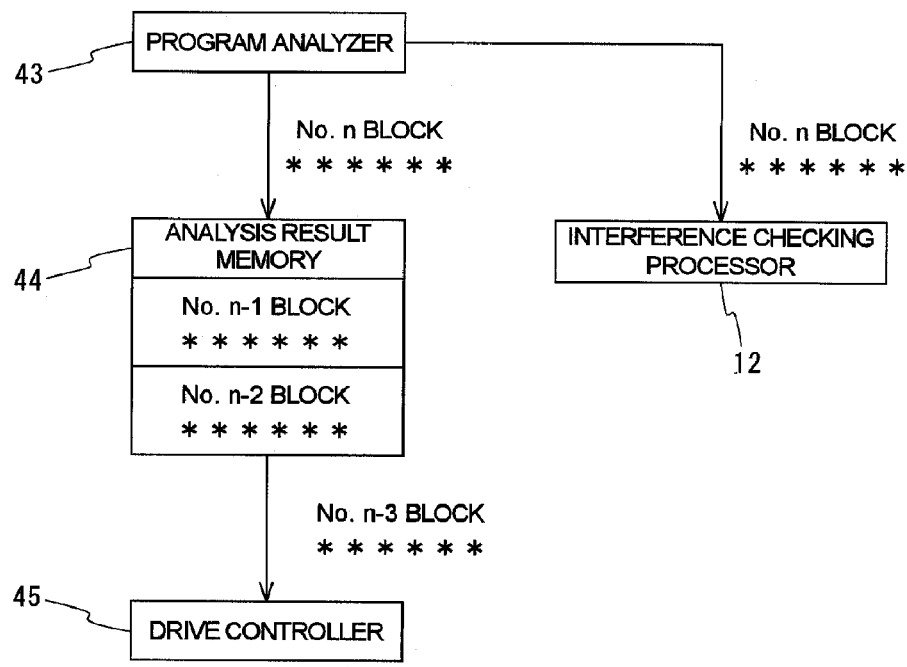
FIG. 3 is an explanatory diagram illustrating the relationship between the block being analyzed by the program analyzer and the block being executed by the drive controller.

Note that as shown in FIG. 3, the program analyzer 43 is constituted such that it sequentially analyzes blocks several blocks ahead of (sequentially beyond) the block being executed by the drive controller 45.

Next, the interference checking device 1 will be described. As described above, the interference checking device 1 is provided with a modeling database 10, an interference data memory 11, an interference checking processor 12, an image data generator 13, a display controller 14 and an image display device 15. Note that the interference checking processor 12 and display controller 14 function together as the interference determination processor.

The modeling database 10 stores three-dimensional modeling data for at least the tool T, workpiece W, spindle 22, chuck 23, first saddle 24, second saddle 25 and tool rest 26 that are generated in advance using a three-dimensional CAD system or the like. This three-dimensional data is constructed such that it contains at least shape data that defines the three-dimensional shapes of the tool T, workpiece W, spindle 22, chuck 23, first saddle 24, second saddle 25 and tool rest 26, along with axis data regarding the axes of travel and/or axes of rotation defined for the tool T, workpiece W, spindle 22, chuck 23, first saddle 24, second saddle 25 and tool rest 26.

Figure 4:
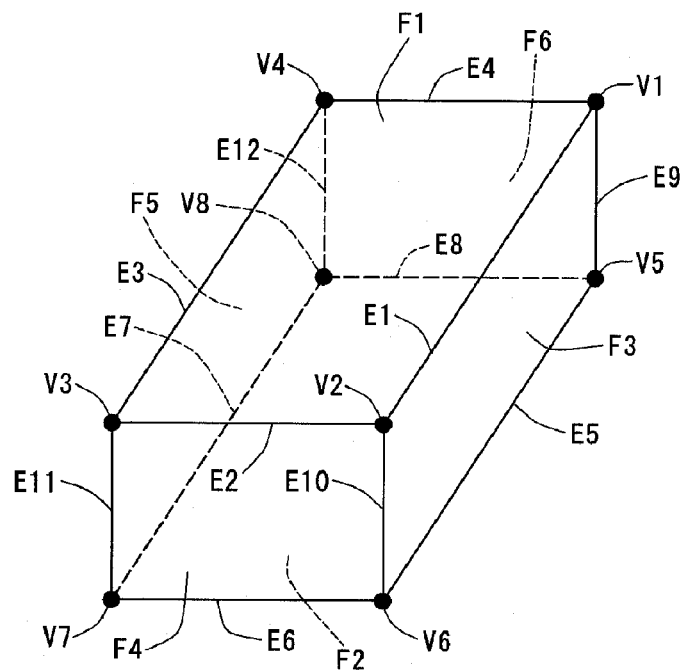
FIG. 4 is an explanatory diagram used to describe the data structure of the three-dimensional modeling data.

The shape data may comprise: vertex coordinate data which constitutes the coordinates of the various vertices constituting the three-dimensional shapes of the tool T, workpiece W, spindle 22, chuck 23, first saddle 24, second saddle 25 and tool rest 26, along with equation data for the edges formed by connecting two vertices, edge data that associates the edges and the two vertices, equation data for faces formed by the enclosure of edges, and face data that associates the faces and the edges. For example, the shape data shown in FIG. 5 describes the three-dimensional shape illustrated in FIG. 4.

Figure 6:
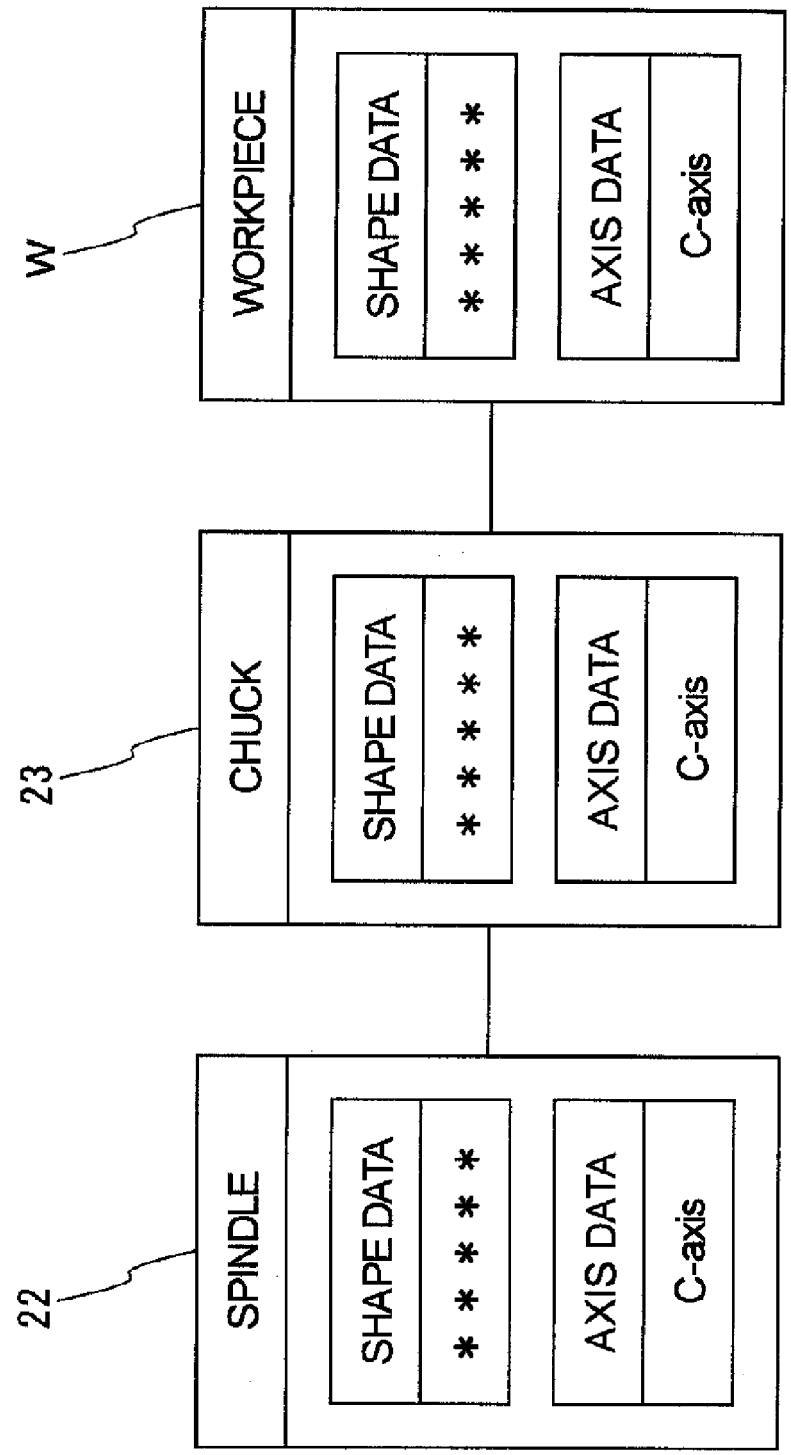
FIG. 6 is an explanatory diagram used to describe the relationship between the various structures and axis data.

The aforementioned axis data is data that defines how the tool T, workpiece W, spindle 22, chuck 23, first saddle 24, second saddle 25 and tool rest 26 move (travel or rotate) in the NC lathe 20. For example, the axis data for the spindle 22 is "C-axis" because the spindle 22 rotates in the direction of the C-axis, and the axis data for the chuck 23 and workpiece W which are connected to the spindle 22 is also "C-axis" because they also rotate in the direction of the C-axis together with the rotation of the spindle 22. In addition, the axis data for the first saddle 24 is "Z-axis" because the first saddle 24 travels in the direction of the Z-axis, but the axis data for the second saddle 25 is "Y-axis and Z-axis" because the second saddle 25 travels in the Y-axis and also travels in the Z-axis together with the travel of the first saddle 24. The axis data for the tool rest 26 is "X-axis, Y-axis and Z-axis" because the tool rest 26 travels in the direction of the X-axis, and also travels in the directions of the Z-axis and Y-axis together with the travel of the first saddle 24 and second saddle 25. The axis data for the tool T is also similarly "X-axis, Y-axis and Z-axis" like the tool rest 26. Note that FIG. 6 illustrates the data structures for the spindle 22, chuck 23 and workpiece W.

The interference data that defines preset mutual interference relationships among the tool T, workpiece W, spindle 22, chuck 23, first saddle 24, second saddle 25 and tool rest 26 is stored in the interference data memory 11.

In the NC lathe 20, the spindle 22, chuck 23 and workpiece W are treated as a single unit, as the spindle 22 is supported by the headstock (not shown), while the first saddle 24, second saddle 25, tool rest 26 and tool T are treated as a single unit, as the first saddle 24 is disposed on the bed 21. Accordingly, no interference relationships arise among the spindle 22, chuck 23 and workpiece W, or among the first saddle 24, second saddle 25, tool rest 26 and tool T, so interference relationships arise only between the spindle 22, chuck 23 and workpiece W and the first saddle 24, second saddle 25, tool rest 26 and tool T.

Moreover, interference between the tool T and workpiece W can be assumed to be machining of the workpiece W by the tool T, (that is, no interference), but this cannot be assumed to be machining unless it is between the tip Tb of the tool T and the workpiece W so if not it is interference.

Figures 7, 8:
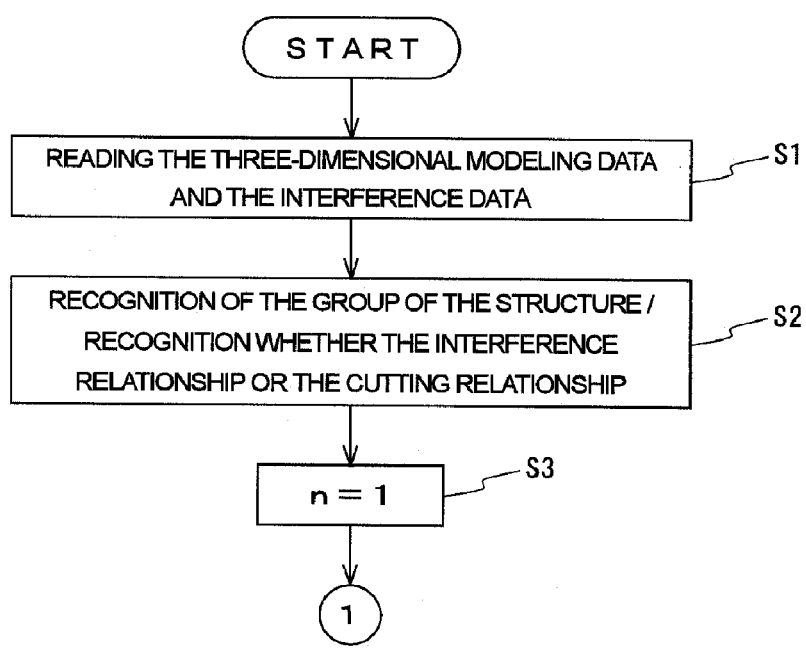
FIG. 7 is an explanatory diagram illustrating the data structure of the interference data stored in the interference data memory according to this embodiment.
FIG. 8 is a flowchart showing a series of processes performed by the interference checking processor.

Thus as shown in FIG. 7, specifically, the tool T, workpiece W, spindle 22, chuck 23, first saddle 24, second saddle 25 and tool rest 26 are divided into groups such that those considered to be a unit are put into the same group, and thus set as data that indicates whether they constitute an interference relationship or cutting relationship.

Moreover, based on this interference data, the spindle 22, chuck 23 and workpiece W are grouped together as Group 1, while the first saddle 24, second saddle 25, tool rest 26 and tool T are grouped as Group 2. Note that as described above, interference does not arise among the constituent elements of Group 1 or among the constituent elements of Group 2, but rather interference relationships arise only between constituent elements of Group 1 and constituent elements of Group 2, and even interference between constituent elements belonging to different Groups is not interference in the case that these constituent elements constitute a cutting relationship with each other, or namely if the interfering constituent elements are the tip Tb of the tool T and the workpiece W.

The interference checking processor 12 sequentially receives movement commands pertaining to the travel position and feedrate of the tool rest 26 and the rotation speed of spindle motor 30 from the program analyzer 43 for each block of the machining program, and based on the received movement commands and the various data stored in the modeling database 10 and interference data memory 11, simultaneously executes in parallel a first process of determining whether there is mutual interference among the tool T, workpiece W, spindle 22, chuck 23, first saddle 24, second saddle 25 and tool rest 26, and a second process of generating three-dimensional image data for the tool T, workpiece W, spindle 22, chuck 23, tool rest 26 and the like based on the movement commands thus received and the various data stored in the modeling database 10.

Figure 9:
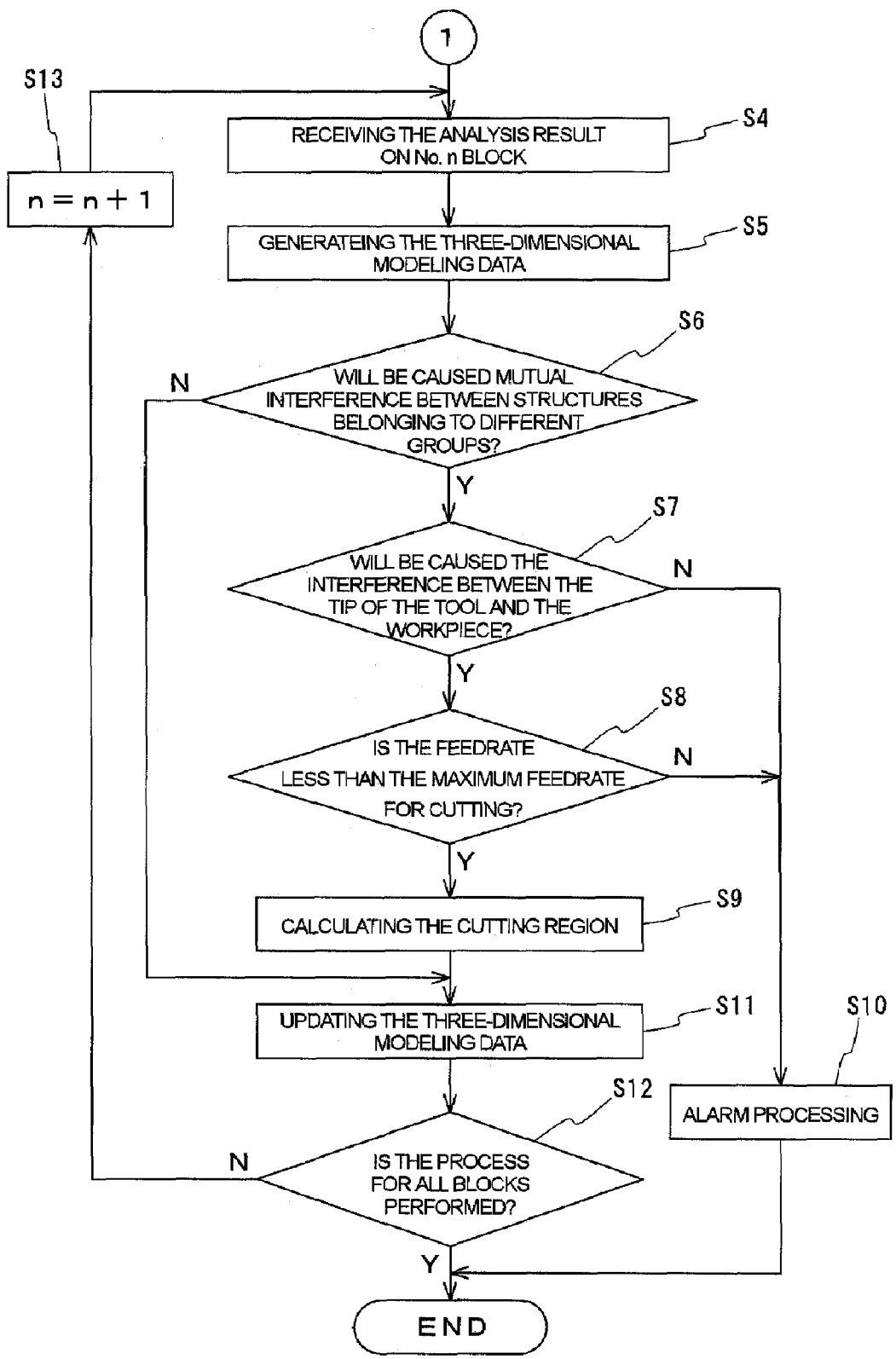
FIG. 9 is a flowchart showing a series of processes performed by the interference checking processor.

The first process comprises sequentially executing the processes shown in FIG. 8 and FIG. 9. First, the three-dimensional modeling data for the tool T, workpiece W, spindle 22, chuck 23, first saddle 24, second saddle 25 and tool rest 26 stored in the modeling database 10 and the interference data stored in the interference data memory 11 are read in and stored in an appropriate memory (not shown) (Step S1). Then, referring to the interference data within this memory (not shown), the groups to which each of the tool T, workpiece W, spindle 22, chuck 23, first saddle 24, second saddle 25 and tool rest 26 belong are recognized and whether they constitute a cutting relationship or an interference relationship is recognized (Step S2).

Next, the counter n is set to 1 (Step S3). For the first block of the machining program, movement commands pertaining to the travel position and feedrate of the tool rest 26 (first saddle 24, second saddle 25) and the rotation speed of the spindle motor 30 sent from the program analyzer 43 are received (Step S4).

Next, based on the three-dimensional modeling data stored in the appropriate memory (not shown) and the travel position of the tool rest 26 and the rotation speed of the spindle motor 30 received in Step S4, three-dimensional modeling data after the first saddle 24, second saddle 25 and tool rest 26 have traveled and the spindle 22 has rotated is generated. At this time, by referencing the axis data for the tool T, the workpiece W and the chuck 23, it is recognized that they travel together with the tool rest 26 and rotate together with the spindle 22, respectively, so three-dimensional modeling data is generated to match the movement of the tool rest 26 and spindle 22. Note that the relationships among the positions at which the tool T, workpiece W, spindle 22, chuck 23, first saddle 24, second saddle 25 and tool rest 26 are disposed are determined by reference to data appropriately set in advance depending on the type or model (constitution) of the tool T, workpiece W, chuck 23 and the NC lathe 20.

Thereafter, based on the interference data stored in the appropriate memory (not shown) and the three-dimensional modeling data generated in Step S5, a check is made as to whether or not the traveling of the first saddle 24, second saddle 25 and tool rest 26 and the rotation of the spindle 22 will cause mutual interference among the tool T, workpiece W, spindle 22, chuck 23, first saddle 24, second saddle 25 and tool rest 26, or namely, a check is made for the presence of portions of contact or overlap among the three-dimensional modeling data sets for structures belonging to different groups (namely among the three-dimensional modeling data sets for the spindle 22, chuck 23 and workpiece W belonging to Group 1 and the three-dimensional modeling data sets for the first saddle 24, second saddle 25, tool rest 26 and tool T belonging to Group 2) (Step S6).

If contact or overlap is determined to be present in Step S6, the procedure advances to Step S7 where a check is made as to whether or not the contact or overlap occurred among constituent elements constituting a cutting relationship to each other, namely whether or not it occurred between the tip Tb of the tool T and the workpiece W (Step S7). If this is determined to be so, the procedure advances to Step S8, where based on the feedrate of the tool rest 26 and the rotation speed of the spindle motor 30 received in Step S4, a check is made as to whether or not the feedrate is less than the maximum feedrate for cutting (Step S8).

If the feedrate is determined to be less than the maximum feedrate for cutting in Step S8, then the procedure advances to Step S9, where the contact or overlap in the three-dimensional modeling data is determined to have been caused by the workpiece W being machined by the tool T, and that overlapping region (the interfering (cut) region) is calculated by a Boolean operation (Step S9).

On the other hand, if the contact or overlap is determined in Step S7 not to have occurred among constituent elements constituting a cutting relationship to each other (namely, it did not occur between the tip Tb of the tool T and the workpiece W), interference is determined to have occurred between the spindle 22, chuck 23 and workpiece W and the first saddle 24, second saddle 25, tool rest 26 and tool T, or if the feedrate is determined in Step S8 to be greater than the maximum feedrate for cutting, then it cannot be regarded as machining of the workpiece W by the tool T and is thus determined to be interference, so an alarm signal is sent to the drive controller 45 and display controller 14 (Step S10) and driving is halted to end this series of processes.

Moreover, if in Step S6 no portions of contact or overlap are determined to be present (no interference has occurred) and the processing of Step S9 is complete, then the procedure advances to Step S11, where the three-dimensional modeling data stored in the appropriate memory (not shown) is updated with the three-dimensional modeling data generated in Step S5, and also, if it is determined that the tool T has cut the workpiece W, then this three-dimensional modeling data is updated such that the cut region calculated in Step S9 is deleted from the workpiece W (Step S11).

Thereafter, the process described above is performed for all blocks of the machining program while the counter n is updated (Steps S12, S13), and then the series of processes ends.

Next, to describe the second process, movement commands pertaining to the travel position and feedrate of the tool rest 26 and the rotation speed of the spindle motor 30 sent sequentially from the program analyzer 43 for each block are received, and based on the movement commands thus received and the three-dimensional modeling data for the tool T, workpiece W, spindle 22, chuck 23 and tool rest 26 stored in the modeling database 10, three-dimensional modeling data and corresponding three-dimensional image data showing the tool rest 26 traveling in a graduated manner and the spindle 22 rotating in a graduated manner are sequentially generated, and the three-dimensional image data thus generated is sent to the display controller 14.

At this time, in the same manner in as the above, by referencing the axis data for the tool T, workpiece W and the chuck 23, it is recognized that they travel together with the tool rest 26 and rotate together with the spindle 22, respectively, so three-dimensional modeling data is generated to match the movement of the tool rest 26 and spindle 22. In addition, if a cut region is present, that cut region is calculated by a Boolean operation and the three-dimensional image data is generated with the three-dimensional modeling data for this workpiece W updated such that this region is deleted from the workpiece W.

The image data generator 13 receives control signals pertaining to the actual movement sent from the drive controller 45, recognizes the travel position and feedrate of the tool rest 26 and the speed of the spindle motor 30, and based on the travel position, feedrate and motor speed thus recognized, along with three-dimensional modeling data for the tool T, workpiece W, spindle 22, chuck 23 and tool rest 26 stored in the modeling database 10, generates three-dimensional modeling data and corresponding three-dimensional image data showing the tool rest 26 traveling in a graduated manner and the spindle 22 rotating in a graduated manner, and sends the three-dimensional image data thus generated to the display controller 14.

At this time, in the same manner in as the above, based on the axis data for the tool T, workpiece W and chuck 23, the three-dimensional modeling data and three-dimensional image data are generated upon recognizing their movement (behavior). In addition, any interference region (cut region) between the tool T and workpiece W is calculated and the corresponding three-dimensional image data is generated with this cut region deleted from the three-dimensional modeling data for the workpiece W.

Note that the relationships among the positions at which the tool T, workpiece W, spindle 22, chuck 23 and tool rest 26 are disposed are determined by reference to data appropriately set in advance depending on the type or model (constitution) of the tool T, workpiece W, chuck 23 and the NC lathe 20.

Figure 10:
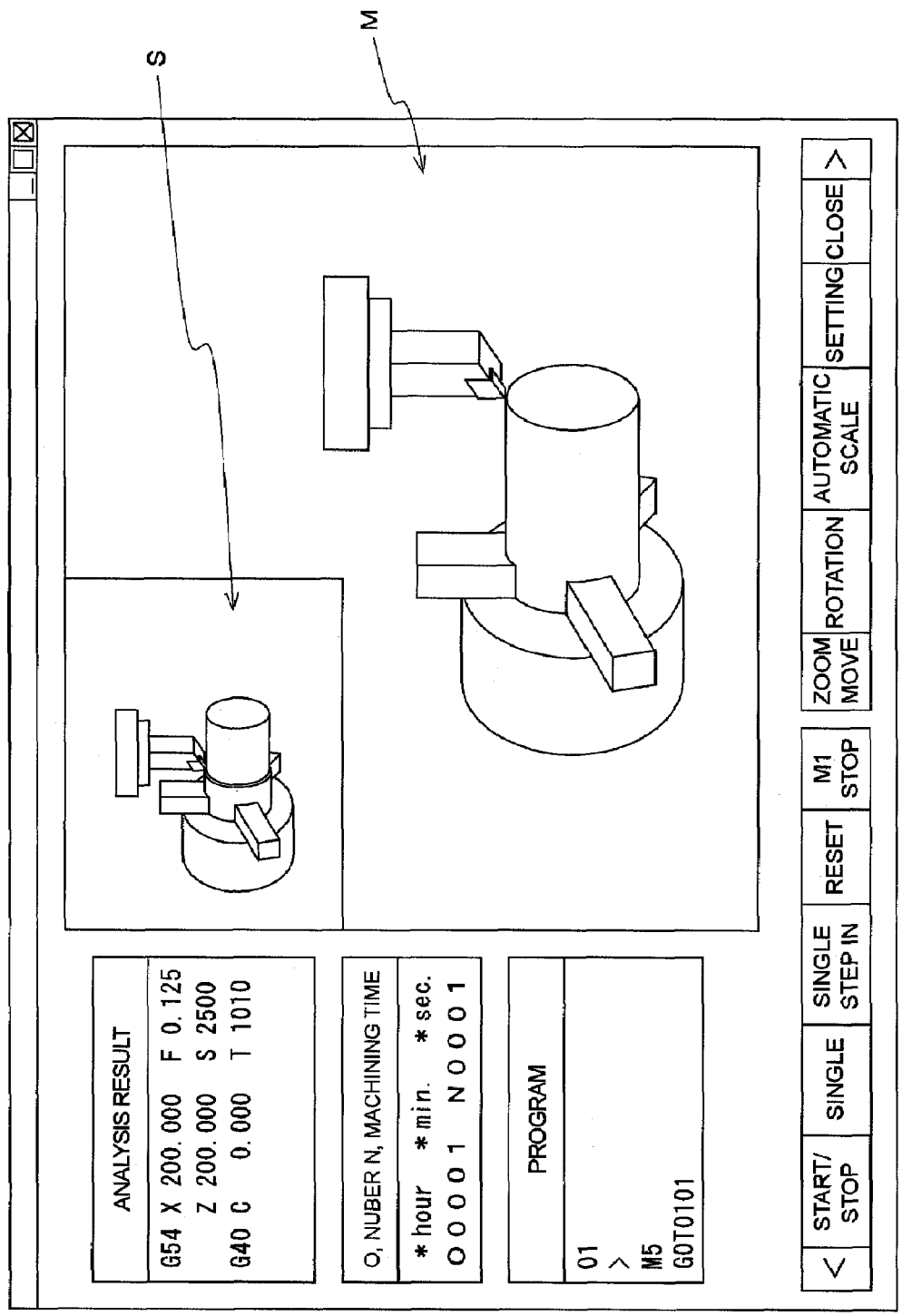
FIG. 10 is an explanatory diagram illustrating an example of a display screen displayed on the image display device.
Figure 11:
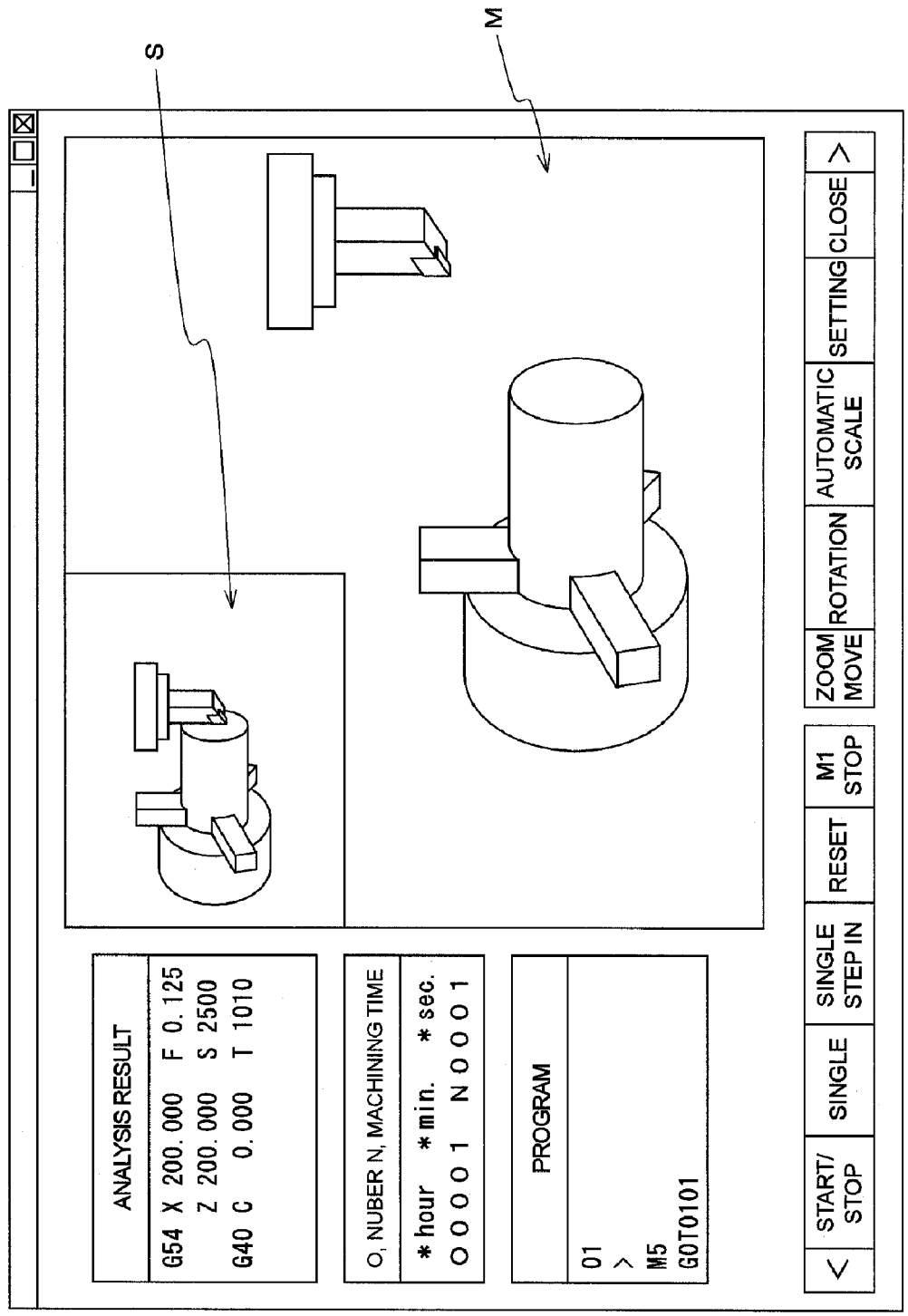
FIG. 11 is an explanatory diagram illustrating an example of a display screen displayed on the image display device.

The display controller 14 receives three-dimensional image data sent from the interference checking processor 12 and image data generator 13, and, as shown on FIG. 10 and FIG. 11, may for example display the three-dimensional image data from the interference checking processor 12 (images used for checking for interference) as a sub-display (the portion indicated by the symbol S) and the three-dimensional image data from the image data generator 13 (images of actual movement) as a main display (the portion indicated by the symbol M) on the image display device 15. In addition, if an alarm signal is received from the interference checking processor 12, then an alarm display may be indicated by causing the display image in the sub-display S to flash, for example.

Note that FIG. 10 illustrates the state in which the workpiece W is being machined by the tool T as displayed in its sub-display S, while FIG. 11 illustrates the state in which there is interference between the workpiece W and the tool T. In addition, the tool rest 26 is large, so only a portion of its tool spindle 26b is displayed.

With the interference checking device 1 of this embodiment constituted as described above, three-dimensional modeling data for at least the tool T, workpiece W, spindle 22, chuck 23, first saddle 24, second saddle 25 and tool rest 26 are stored in advance in the modeling database 10, and interference data that defines mutual interference relationships among the tool T, workpiece W, spindle 22, chuck 23, first saddle 24, second saddle 25 and tool rest 26 is stored in advance in the interference data memory 11.

In the interference checking processor 12, based on movement commands pertaining to the travel position and feedrate of the tool rest 26 and the speed of spindle motor 30 from the program analyzer 43 for each block of the machining program and the three-dimensional modeling data and interference data stored in the modeling database 10 and interference data memory 11, a determination is made as to whether or not mutual interference is present among the tool T, workpiece W, spindle 22, chuck 23, first saddle 24, second saddle 25 and tool rest 26. If interference is found, then an alarm signal is sent to the display controller 14 and the drive controller 45. In addition, three-dimensional image data for the tool T, workpiece W, spindle 22, chuck 23, tool rest 26 and the like is generated based on the movement commands and the three-dimensional modeling data.

Moreover, in the image data generator 13, based on control signals (travel position and feedrate of the tool rest 26, speed of the spindle motor 30) sent from the drive controller 45 and the three-dimensional modeling data stored in the modeling database 10, three-dimensional image data for the tool T, workpiece W, spindle 22, chuck 23 and tool rest 26 is generated.

Moreover, the display controller 14 sequentially displays on the image display device 15, display images as shown in FIG. 10 and FIG. 11 based on three-dimensional image data for the tool T, workpiece W, spindle 22, chuck 23 and tool rest 26 from the start of movement until the end of movement (from the first block to the last block of the NC program) that are generated by the interference checking processor 12 and image data generator 13, respectively.

Note that the three-dimensional image data generated by the image data generator 13 is synchronized to the actual movement of the tool rest 26 and spindle 22 and shown as the main display, while the three-dimensional image data generated by the interference checking processor 12 illustrates the state of movement of the tool rest 26 and spindle 22 when the machining program has advanced by several blocks (ahead), and is shown as the sub-display.

Moreover, when received by the drive controller 45, an alarm signal sent from the interference checking processor 12 halts the operation of the various feed mechanisms 27, 28 and 29 and the spindle motor 30. In addition, when received by the display controller 14, it causes an alarm display in which the image displayed on the sub-display S flashes.

In this manner, with the interference checking device 1 according to this embodiment, the interference checking processor 12 uses three-dimensional modeling data for the tool T, workpiece W, spindle 22, chuck 23, first saddle 24, second saddle 25 and the tool rest 26 to automatically check for the presence of interference with regard to the interference relationships among the tool T, workpiece W, spindle 22, chuck 23, first saddle 24, second saddle 25 and the tool rest 26 defined by interference data, so interference checking can be performed accurately and efficiently with regard to any kid of interference relationship.

Moreover, the determination of interference is performed according to movement commands in a block ahead of the block being executed in the drive controller 45 in order to control the feed mechanisms 27, 28 and 29 and the spindle motor 30, and the operation of the feed mechanisms 27, 28 and 29 and the spindle motor 30 is halted if interference is determined to be present, so the presence of interference can be checked in advance before the feed mechanisms 27, 28 and 29 and spindle motor 30 are driven and the tool rest 26 and spindle 22 are actually moved, and thus it is possible to reliably prevent interference.

Moreover, by observing the three-dimensional images of the tool T, workpiece W, spindle 22, chuck 23 and tool rest 26 displayed on the image display device 15, the operator can check the current state of movement of the tool rest 26 and the spindle 22, and the state of movement of the tool rest 26 and spindle 22 in the future, which is convenient. This is because when the actual tool T, workpiece W, spindle 22, chuck 23 and tool rest 26 are observed, interference is often difficult to observe visually because of the positional relationships of the elements and the positions of peepholes provided on the covers and guards that enclose the machining area. In addition, it also may not be easy to identify the location where interference is occurring.

The above is a description of one embodiment of the present invention, but the specific mode of implementation of the present invention is in no way limited thereto.

The embodiment above presented the NC lathe 20 as one example of the machine tool, but the interference checking device 1 according to this embodiment can also be provided in a machining center or various other types of machine tool. Moreover, with regard to the axis configuration of the machine tool, the present invention is also applicable to tools of any axis configurations.

Moreover, the above embodiment is constituted such that three-dimensional images of the tool T, workpiece W, spindle 22, chuck 23 and tool rest 26 are displayed on a screen, but there is no limitation to this, as images of the first saddle 24 or tool rest 26, or images of the entire tool rest 26 may also be displayed.

Moreover, the interference checking processor 12 is constituted such that the first process and second process are executed based on movement commands sent from the program analyzer 43, but there is no limitation to this, as the constitution may be such that the NC program stored in the program memory 41 is read out directly and sequentially analyzed block by block, and then movement commands pertaining to the travel position or feedrate of the tool rest 26 and the speed of the spindle motor 30 are extracted, and the first process and second process executed based on the movement commands thus extracted. Note that in this case also, the interference checking processor 12 is constituted such that it sequentially analyzes blocks that are several blocks ahead of the block being executed by the drive controller 45.

Moreover, the program analyzer 43 is constituted such that it can receive and analyze an NC program appropriately input manually from a keyboard by means of an MDI function, and if so, then the interference check can be performed by the interference checking processor 12 in the same manner as above on the NC program input by means of the MDI function.

Moreover, the three-dimensional modeling data stored in the modeling database 10 may be generated by any means, but in order to perform high-precision interference checking, it is preferable to use data that is generated accurately rather than data that is generated simply.

Here follows a brief description of various methods of generating three-dimensional modeling data.

In a first example of such a method, two CCD cameras provided a predetermined distance apart capture suitable images of the structures from the three orthogonal directions in the X-axis, Y-axis and Z-axis, thus generating two sets of two-dimensional image data of each of the structures in each direction, and based on the two sets of two-dimensional image data in each direction, the coordinate positions of the visible outlines (contour lines) of the structure in three-dimensional space are calculated by triangulation, and next, based on the coordinate positions of the contour lines calculated for each of the directions and the relative positional relationship between the CCD cameras, the three-dimensional shape of the structure is estimated by taking these contour lines to be the respective edges, thus generating three-dimensional modeling data containing at least shape data that defines the three-dimensional shape.

In a second example of such a method, for the shape of the tool or the shape of the chuck, the coordinates of the shape of the surface and the depth may be input, or the coordinates of its shape in longitudinal cross-section centered around the axis of rotation may be input, and the three-dimensional modeling data may be generated based on these input coordinates.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. For a machine tool furnished with a plurality of structures including at least tool- and workpiece-holding structures, with drive mechanisms for driving structures, among said plurality of structures, equipped to be movable, and with a controller having an analytical processor for sequentially analyzing a machining program block by block and extracting at least movement commands involving the movable structures, and having a control execution processor for executing the machining program blocks by generating control signals based on the movement commands sequentially extracted by the analytical processor and controlling operation of the drive mechanisms based on the generated control signals, an interference checking device for ascertaining whether, due to movement by the movable structures when driven by the drive mechanisms and operationally controlled by the controller, the movable structures themselves, the other structures apart from the movable structures, or tools and workpieces held by the tool- and workpiece-holding structures, will interfere with each other, the interference checking device comprising:

a modeling data memory for storing three-dimensional modeling data constituted to include at least shape data defining the three-dimensional shape of each structure in the plurality of structures and the three-dimensional shapes of the tools and workpieces held by the tool- and workpiece-holding structures, and storing information related to axes of travel and/or axes of rotation established for said structures, tools, and workpieces;

an interference data memory for storing interference data defining inter-component interference relationships among said structures, tools, and workpieces; and an interference determination processor for sequentially receiving from the analytical processor movement commands in a block at least one block succeeding the block being executed in the control execution processor of the controller, generating, based on the received movement commands and the three-dimensional modeling data stored in the modeling data memory, data three-dimensionally modeling the states into which the structures involving the movement commands in said succeeding block would be moved;

determining, based on the generated three-dimensional modeling data and on the interference data stored in the interference data memory, whether, by the movement of said structures involving said succeeding-block movement commands, said structures themselves, other structures apart from said structures, or the tools and workpieces held by the tool- and workpiece-holding structures will interfere with each other; and updating the three-dimensional modeling data stored in the modeling data memory with the generated three-dimensional modeling data.

2. For a machine tool furnished with a plurality of structures including at least tool- and workpiece-holding structures, with drive mechanisms for driving structures, among said plurality of structures, equipped to be movable, and with a controller having an analytical processor for sequentially analyzing a machining program block by block and extracting at least movement commands involving the movable structures, and having a control execution processor for executing the machining program blocks by generating control signals based on the movement commands sequentially extracted by the analytical processor and controlling operation of the drive mechanisms based on the generated control signals, an interference checking device for ascertaining whether, due to movement by the movable structures when driven by the drive mechanisms and operationally controlled by the controller, the movable structures themselves, the other structures apart from the movable structures, or tools and workpieces held by the tool- and workpiece-holding structures, will interfere with each other, the interference checking device comprising:

a modeling data memory for storing three-dimensional modeling data constituted to include at least shape data defining the three-dimensional shape of each structure in the plurality of structures and the three-dimensional shapes of the tools and workpieces held by the tool- and workpiece-holding structures, and storing information related to axes of travel and/or axes of rotation established for said structures, tools, and workpieces;

an interference data memory for storing interference data defining inter-component interference relationships among said structures, tools, and workpieces; and an interference determination processor for sequentially analyzing the machining program block by block and extracting movement commands in a block at least one block succeeding the block being executed in the control execution processor of the controller;

generating, based on the received movement commands and the three-dimensional modeling data stored in the modeling data memory, data three-dimensionally modeling the states into which the structures involving the movement commands in said succeeding block would be moved;

determining, based on the generated three-dimensional modeling data and on the interference data stored in the interference data memory, whether, by the movement of said structures involving said succeeding-block movement commands, said structures themselves, other structures apart from said structures, or the tools and workpieces held by the tool- and workpiece-holding structures will interfere with each other; and updating the three-dimensional modeling data stored in the modeling data memory with the generated three-dimensional modeling data.

3. An interference checking device according to claim 1, wherein said interference determination processor outputs an alarm if said interference determination processor has determined that any of said structures or the tools and workpieces held by the tool- and workpiece-holding structures will interfere with each other.

4. An interference checking device according to claim 2, wherein said interference determination processor outputs an alarm if said interference determination processor has determined that any of said structures or the tools and workpieces held by the tool- and workpiece-holding structures will interfere with each other.

5. The interference checking device according to claim 1, further comprising an image display device, wherein:

based on the movement commands, and on the three-dimensional modeling data stored in the modeling data memory, the interference determination processor sequentially generates data three-dimensionally modeling the states into which said structures involving said succeeding-block movement commands would be moved in a graduated manner, and sequentially generates corresponding three-dimensional image data; and the three-dimensional images generated from the start to the end of the movement based on said succeeding-block movement commands are displayed sequentially on the image display device.

6. The interference checking device according to claim 2, further comprising an image display device, wherein:

based on the movement commands, and on the three-dimensional modeling data stored in the modeling data memory, the interference determination processor sequentially generates data three-dimensionally modeling the states into which said structures involving said succeeding-block movement commands would be moved in a graduated manner, and sequentially generates corresponding three-dimensional image data; and the three-dimensional images generated from the start to the end of the movement based on said succeeding-block movement commands are displayed sequentially on the image display device.

* * * * *